UNITED STATES PATENT OFFICE.

ERNST MECKBACH, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

NEW YELLOW LAKE.

970,073. Specification of Letters Patent. Patented Sept. 13, 1910.

No Drawing. Application filed May 17, 1910. Serial No. 561,867.

*To all whom it may concern:*

Be it known that I, ERNST MECKBACH, doctor of philosophy, chemist, citizen of the German Empire, residing at Vohwinkel, near Elberfeld, Germany, have invented new and useful Improvements in New Yellow Lakes, of which the following is a specification.

I have found that 1.5-dibenzoyldiaminoanthraquinone (when mixed with substrata such for instance as alumina, china clay and blanc fixe) yields valuable pigments or lakes, which have a valuable yellow shade and are fast to light, oil, alcohol, water and resist the action of chemicals such as chlorin or nitric acid.

In order to illustrate the new process more fully the following examples are given, the parts being by weight:—

Example 1: A solution of 10 parts of symmetrical 1.5 - dibenzoyl - diaminoanthraquinone in 100 parts of sulfuric acid (66° Bé.) cooled to 10° C. is added to a solution which has to be stirred of 20—40 parts of barium chlorid in 600 parts of ice water. The lake is filtered off, washed, dried and ground.

Example 2: 100 kilos of a 10 per cent. paste of symmetrical dibenzoyl-1.5 - diaminoanthraquinone are dissolved in 100 kilos of caustic soda lye 34° Bé., 300 liters hydrosulfite solution (17° Bé.) and 500 liters water. A solution of 40 kilos of aluminium sulfate is added to this vat and the lake is precipitated by blowing air and $CO_2$ into the mixture. The lake is then further treated in the usual way.

Example 3: 10 parts of 1.5-dibenzoyldiaminoanthraquinone are ground together with 90 parts of heavy spar with the addition of water.

Any other method for producing pigments or lakes can be used.

I claim:—

The new yellow color lake prepared from the symmetrical 1.5 - dibenzoyldiaminoanthraquinone, said lake being distinguished bi its valuable yellow shade and its fastness to light, water and oil, substantially as described.

In testimony whereof I have hereunto set my hand in the presence of two subscribing witnesses.

ERNST MECKBACH. [L. S.]

Witnesses:
OTTO KÖNIG,
CHAS. J. WRIGHT.